United States Patent
Lee et al.

(10) Patent No.: US 8,045,816 B2
(45) Date of Patent: Oct. 25, 2011

(54) IMAGE QUANTIZATION METHOD AND APPARATUS WITH COLOR DISTORTION REMOVING QUANTIZATION MATRIX

(75) Inventors: Mi-yeon Lee, Suwon-si (KR); Bo-gun Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1084 days.

(21) Appl. No.: 11/835,023

(22) Filed: Aug. 7, 2007

(65) Prior Publication Data

US 2008/0037888 A1   Feb. 14, 2008

(30) Foreign Application Priority Data

Aug. 9, 2006  (KR) .................. 10-2006-0075303

(51) Int. Cl.
  *G06K 9/00*  (2006.01)
(52) U.S. Cl. ..... 382/252; 382/253; 348/273; 348/400.1; 358/465; 358/466; 375/240.01; 375/240.03
(58) Field of Classification Search .................. 382/251, 382/252, 253; 348/273, 400.1; 358/465, 358/466; 375/240.01, 240.03
See application file for complete search history.

(56) References Cited

U.S. PATENT DOCUMENTS

| 5,621,465 A | 4/1997 | Kondo |
| 6,320,668 B1* | 11/2001 | Kim ............................... 358/1.1 |
| 6,600,836 B1* | 7/2003 | Thyagarajan et al. ........ 382/239 |
| 2001/0045988 A1* | 11/2001 | Yamauchi et al. ............ 348/273 |

FOREIGN PATENT DOCUMENTS

| JP | 03283989 A | 12/1991 |
| JP | 10-013859 A | 1/1998 |
| JP | 2000-092329 | * 3/2000 |
| KR | 20010104058 A | 11/2001 |
| WO | WO 0156298 A1 | 8/2001 |

* cited by examiner

*Primary Examiner* — Bhavesh Mehta
*Assistant Examiner* — Eueng-Nan Yeh
(74) *Attorney, Agent, or Firm* — Sughrue Mion, PLLC

(57) ABSTRACT

An image quantization method and apparatus are provided in which a block with a high possibility of having color distortion is more elaborately quantized using a predetermined color distortion removing quantization matrix. The image quantization method includes determining a possibility of color distortion in the block using discrete cosine transform (DCT) coefficients and pixel values of the block of predetermined size of an image and performing initial quantization on the block using a predetermined color distortion quantization matrix to remove color distortion if the block has a high possibility of color distortion.

22 Claims, 8 Drawing Sheets

FIG. 1A (RELATED ART)

☐ : EVEN-NUMBERED FIELD
▨ : ODD-NUMBERED FIELD

FIG. 1B (RELATED ART)

☐ : EVEN-NUMBERED FIELD
▨ : ODD-NUMBERED FIELD

PIXEL OF ODD-NUMBERED ROWS ALONG VERTICAL DIRECTION

FIG. 9B

PIXEL OF ODD-NUMBERED ROWS ALONG VERTICAL DIRECTION

IMAGE QUANTIZATION METHOD AND APPARATUS WITH COLOR DISTORTION REMOVING QUANTIZATION MATRIX

CROSS-REFERENCE TO RELATED PATENT APPLICATION

This application claims priority from Korean Patent Application No. 10-2006-0075303, filed on Aug. 9, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to image encoding, and more particularly, to image quantization which is performed elaborately by applying a predetermined color distortion removing quantization matrix to a block that has a high possibility of having color distortion.

2. Description of the Related Art

A digital image signal is divided into blocks of a predetermined size, e.g., 8×8 blocks, in a spatial domain to be transformed into a frequency domain using discrete cosine transforms (DCTs). In general, since the human visual system is sensitive to low-frequency components, quantization is performed on the digital image signal using a quantization matrix based on the characteristics of the human visual system and compression efficiency in image compression standards such as the Moving Picture Experts Group (MPEG) standard.

A color signal includes a luminance signal indicating brightness characteristics of the color signal and a chrominance signal indicating color characteristics of the color signal. In related art methods such as the MPEG-2 standard, the same DCT transformation matrix is applied to both the luminance signal and the chrominance signal. For example, if an input 8×8 block is X, an 8×8 DCT transformation matrix is C, and Y is a DCT-transformed matrix based on an 8×8 block based DCT transformation, a forward DCT is defined as $Y=CXC^T$ and C is defined as follows:

$$C = \begin{bmatrix} C_4 & C_4 & C_4 & C_4 & C_4 & C_4 & C_4 & C_4 \\ C_1 & C_3 & C_5 & C_7 & -C_7 & -C_5 & -C_3 & -C_1 \\ C_2 & C_6 & -C_6 & -C_2 & -C_2 & -C_6 & C_6 & C_2 \\ C_3 & -C_7 & -C_1 & -C_5 & C_5 & C_1 & C_7 & -C_3 \\ C_4 & -C_4 & -C_4 & C_4 & C_4 & -C_4 & -C_4 & C_4 \\ C_5 & -C_1 & C_7 & C_3 & -C_3 & -C_7 & C_1 & -C_5 \\ C_6 & -C_2 & C_2 & -C_6 & -C_6 & C_2 & -C_2 & C_6 \\ C_7 & -C_5 & C_3 & -C_1 & C_1 & -C_3 & C_5 & -C_7 \end{bmatrix} \quad (1)$$

$$(C_n = \cos(n\pi/16), n = 1, \ldots, 7)$$

According to the MPEG-2 standard, the same quantization matrix is used to quantize both a luminance signal and a chrominance signal that are sampled at a ratio of 4:2:0 and then undergo transformation to the frequency domain using DCTs. For example, a quantization matrix such as Equation 2 shown below is applied to a DCT coefficient block of intrapredicted luminance and chrominance signals and a quantization matrix such as Equation 3 shown below is applied to a DCT coefficient block of interpredicted luminance and chrominance signals.

$$\begin{bmatrix} 8 & 16 & 19 & 22 & 26 & 27 & 29 & 34 \\ 16 & 16 & 22 & 24 & 27 & 29 & 34 & 37 \\ 19 & 22 & 26 & 27 & 29 & 34 & 34 & 38 \\ 23 & 22 & 26 & 27 & 29 & 34 & 37 & 40 \\ 22 & 26 & 27 & 29 & 32 & 35 & 40 & 48 \\ 26 & 27 & 29 & 32 & 35 & 40 & 48 & 58 \\ 26 & 27 & 29 & 34 & 38 & 46 & 56 & 69 \\ 27 & 29 & 35 & 38 & 46 & 56 & 69 & 83 \end{bmatrix} \quad (2)$$

$$\begin{bmatrix} 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \\ 16 & 16 & 16 & 16 & 16 & 16 & 16 & 16 \end{bmatrix} \quad (3)$$

Figure 1A:
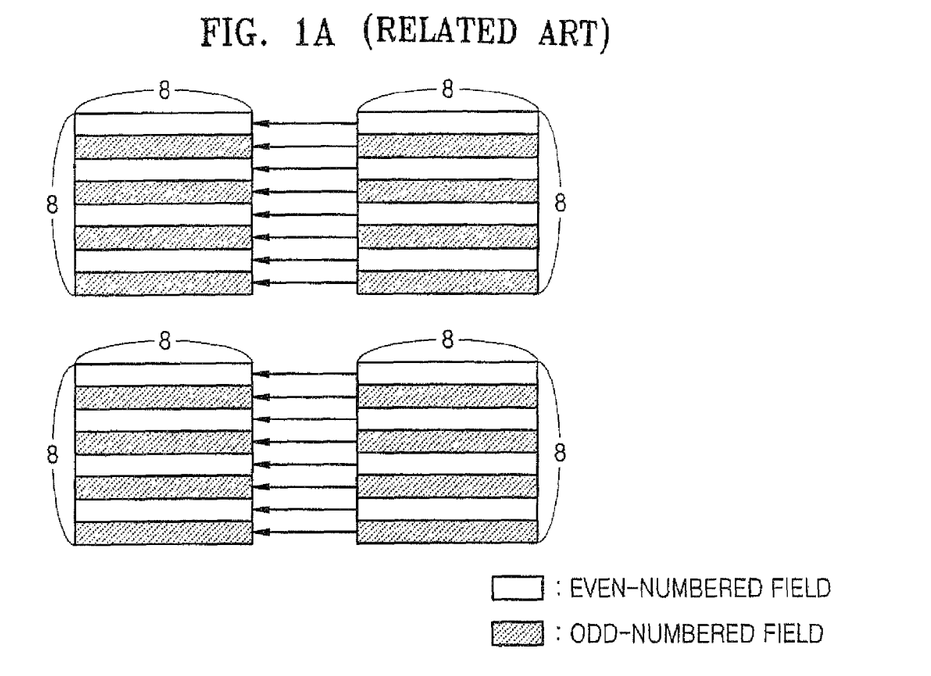
FIG. 1A is a view illustrating a frame DCT method according to the related art.
Figure 1B:
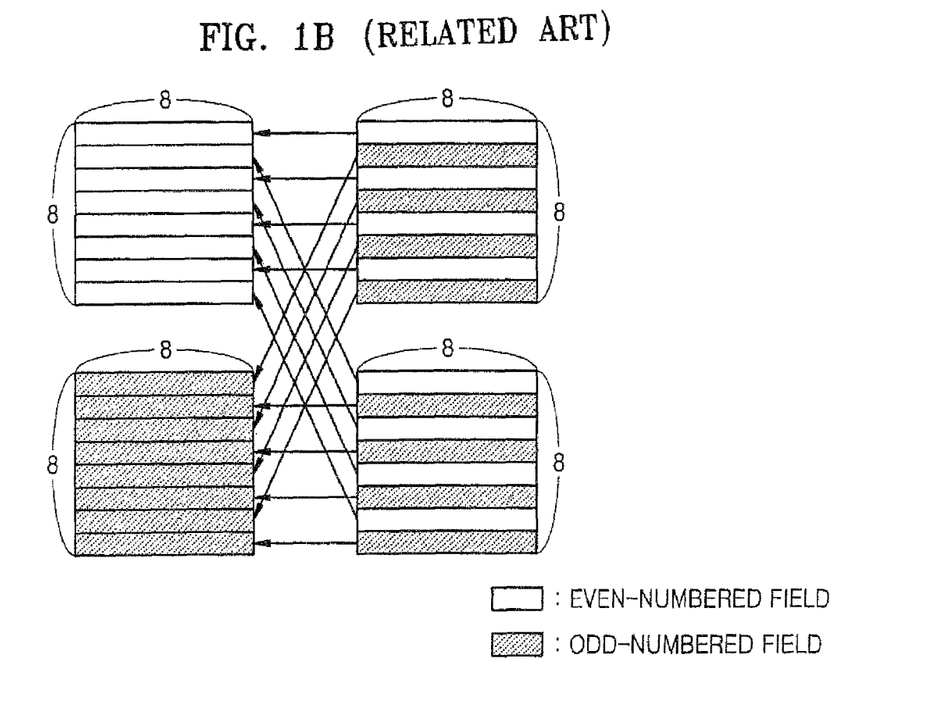
FIG. 1B is a view illustrating a field DCT method according to the related art.

FIG. 1A is a view illustrating a frame DCT method according to the related art and FIG. 1B is a view illustrating a field DCT method according to the prior art.

Referring to FIG. 1A, in the frame DCT method, an entire input 8×8 block is directly transformed to the frequency domain using DCT, i.e., even-numbered rows and odd-numbered rows of the input block are transformed as a whole. Referring to FIG. 1B, in the field DCT method, an input 8×8 block is divided into even-numbered fields composed of even-numbered rows and odd-numbered fields composed of odd-numbered rows and the transformations to the frequency domain using DCT's on the even-numbered fields and the odd-numbered fields are carried out separately.

In the MPEG-2 standard, a chrominance signal sampled at a ratio of 4:2:0 is transformed using DCT using the frame DCT method at all times. However, when this chrominance signal is presented in an interlaced format, if chrominance signals change significantly between fields, the occurrence of color distortion is inevitable.

For example, it is assumed that an input 8×8 color block X has a characteristic in which there exists a large difference between fields, i.e., pixel values of even-numbered rows and pixel values of odd-numbered rows are as follows:

$$X = \begin{bmatrix} 170 & 170 & 170 & 170 & 170 & 170 & 170 & 170 \\ 30 & 30 & 30 & 30 & 30 & 30 & 30 & 30 \\ 170 & 170 & 170 & 170 & 170 & 170 & 170 & 170 \\ 30 & 30 & 30 & 30 & 30 & 30 & 30 & 30 \\ 170 & 170 & 170 & 170 & 170 & 170 & 170 & 170 \\ 30 & 30 & 30 & 30 & 30 & 30 & 30 & 30 \\ 170 & 170 & 170 & 170 & 170 & 170 & 170 & 170 \\ 30 & 30 & 30 & 30 & 30 & 30 & 30 & 30 \end{bmatrix} \quad (4)$$

After the input block X is transformed using DCT and quantized, inverse quantization and inverse DCT are performed on the DCT-transformed and quantized block, thereby generating a reconstructed block X' as follows:

$$X' = \begin{bmatrix} 139 & 139 & 139 & 139 & 139 & 139 & 139 & 139 \\ 38 & 38 & 38 & 38 & 38 & 38 & 38 & 38 \\ 225 & 225 & 225 & 225 & 225 & 225 & 225 & 225 \\ 0 & 0 & 0 & 0 & 0 & 0 & 0 & 0 \\ 246 & 246 & 246 & 246 & 246 & 246 & 246 & 246 \\ 1 & 1 & 1 & 1 & 1 & 1 & 1 & 1 \\ 188 & 188 & 188 & 188 & 188 & 188 & 188 & 188 \\ 87 & 87 & 87 & 87 & 87 & 87 & 87 & 87 \end{bmatrix} \quad (5)$$

Referring to Equation 4 and Equation 5, when DCT, quantization, inverse quantization, and inverse DCT are performed on a block such as the input block X in which there is a large difference between pixel values of the fields, the amount of change between pixel values of fields of the reconstructed block X' increases even more, thereby causing color distortion. Such color distortion becomes worse during up-scaling and deinterlacing of the chrominance signal at a decoder side.

SUMMARY OF THE INVENTION

The present invention provides an image quantization method and apparatus, in which the occurrence of color distortion is prevented during image encoding for a block having large differences between pixel values of fields, i.e., a large change between even-numbered rows and odd-numbered rows.

According to an aspect of the present invention, there is provided an image quantization method including determining a possibility of color distortion using DCT coefficients and pixel values of a block of a predetermined size of an image and performing initial quantization on the block using a predetermined color distortion quantization matrix to remove color distortion if the block has a high possibility of color distortion.

According to another aspect of the present invention, there is provided an image quantization apparatus including a color distortion determination unit and a color distortion removing unit. The color distortion determination unit determines a possibility of color distortion in a block of a predetermined size of an image using DCT coefficients and pixel values of the block. The color distortion removing unit performs initial quantization on the block using a predetermined color distortion quantization matrix to remove color distortion if the block has a high possibility of color distortion.

BRIEF DESCRIPTION OF THE DRAWINGS

The above and other aspects of the present invention will become more apparent by describing in detail an exemplary embodiment thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings. For convenience of explanation, encoding of a luminance (Y) block and a chrominance (Cb, Cr) block that are presented in an interlaced format having a color distortion problem and are sampled at a ratio of 4:2:0 will be taken as an example.

An image quantization method and apparatus according to an exemplary embodiment of the present invention determines a possibility of color distortion using DCT coefficients and pixel values of an input block and elaborately performs quantization on and assigns a large amount of bits to a block with a high possibility of having color distortion, thereby reducing the occurrence of color distortion.

Figure 2:
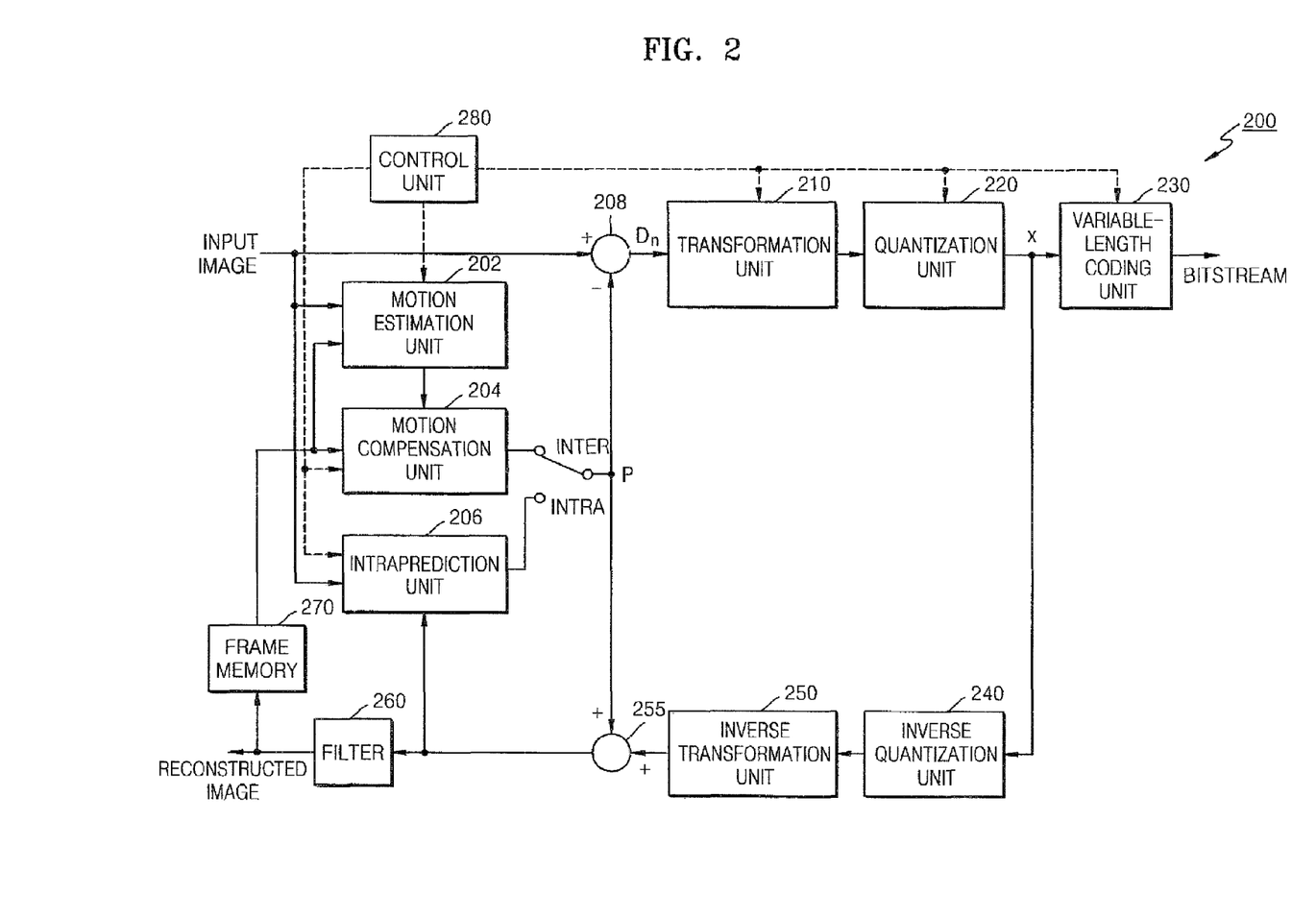
FIG. 2 is a block diagram of an image encoder to which an image quantization apparatus according to an exemplary embodiment of the present invention is applied.

FIG. 2 is a block diagram of an image encoder 200 to which an image quantization apparatus according to an exemplary embodiment of the present invention is applied.

Referring to FIG. 2, the image encoder 200 includes a motion estimation unit 202, a motion compensation unit 204, an intraprediction unit 206, a subtraction unit 208, a transformation unit 210, a quantization unit 220, a variable-length coding unit 230, an inverse quantization unit 240, an inverse transformation unit 250, an addition unit 255, a filter 260, a frame memory 270, and a control unit 280. The image quantization apparatus according to an exemplary embodiment of the present invention corresponds to the quantization unit 220.

The motion estimation unit 202 and the motion compensation unit 204 perform motion estimation and compensation using a previous frame stored in the frame memory 270 in order to generate an interpredicted block. The intraprediction unit 206 performs intraprediction in which a prediction block of the current block is searched for in the current frame.

Once the prediction block to be referred to by the current block is generated by interprediction or intraprediction, the subtraction unit 208 subtracts the prediction block from the current block in order to generate a residue block.

The transformation unit 210 performs DCT on the residue block that is input in units of an 8×8 block in order to remove spatial correlation, and the quantization unit 220 performs quantization on DCT coefficients obtained by the transformation unit 210 for compression. In particular, the quantization unit 220 according to an exemplary embodiment of the present invention performs conventional quantization on a luminance block of the residue block, but, for a chrominance block of the residue block, determines a possibility of color distortion using DCT coefficients and pixel values of the chrominance block and performs quantization using a predetermined color distortion removing quantization matrix if the chrominance block has a high possibility of color distortion.

The variable-length coding unit 230 generates a bitstream with the statistical redundancy from DCT-transformed and quantized data removed.

The inverse quantization unit 240 performs inverse quantization on image data that is quantized by the quantization unit 220. The inverse transformation unit 250 performs inverse transformation on image data that is inversely quantized by the inverse quantization unit 240. The addition unit 255 reconstructs an image by adding the inversely transformed image data to the interpredicted or intrapredicted image data. The reconstructed image passes through the filter 260 and is then stored in the frame memory 270 to be used as a reference image for interprediction of the next frame. The reconstructed image before filtering is input to the intraprediction unit 206 to be used as a previously processed reference block for intraprediction of the current block.

The control unit 280 controls components of the image encoder 200 and determines a prediction mode for the current block. For example, the control unit 280 determines a prediction mode that minimizes a difference between the interpredicted or intrapredicted block and the original block. More specifically, the control unit 280 calculates a cost of an interpredicted image and a cost of an intrapredicted image and selects a prediction mode having the smallest cost to be a final prediction mode. Here, cost calculation may be performed in various ways. There are cost functions such as a sum of absolute difference (SAD), a sum of absolute transformed difference (SATD), a sum of squared difference (SSD), a mean of absolute difference (MAD), and a Lagrange function.

Figure 3:
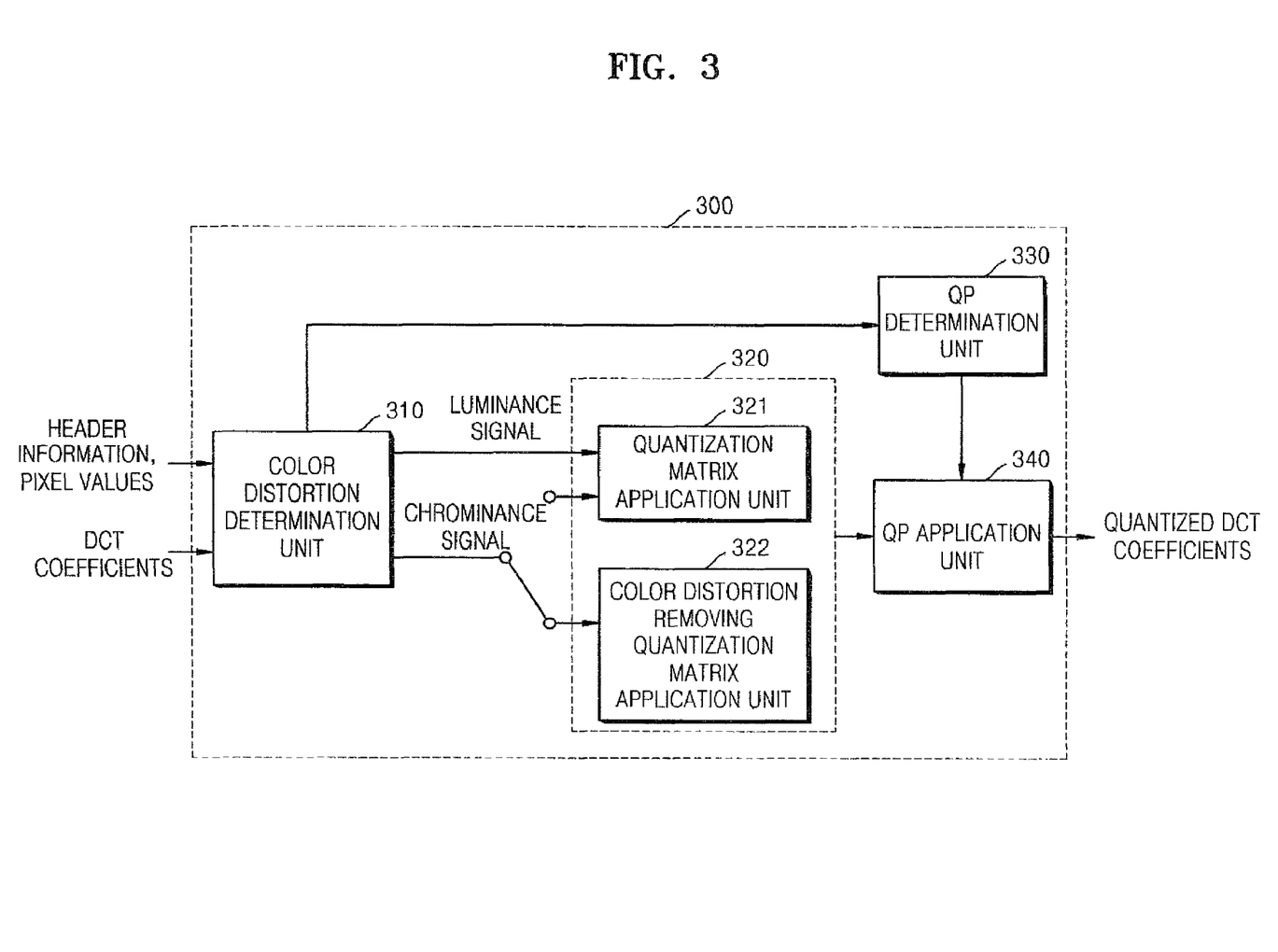
FIG. 3 is a detailed block diagram of the image quantization apparatus according to an exemplary embodiment of the present invention.
Figure 4:
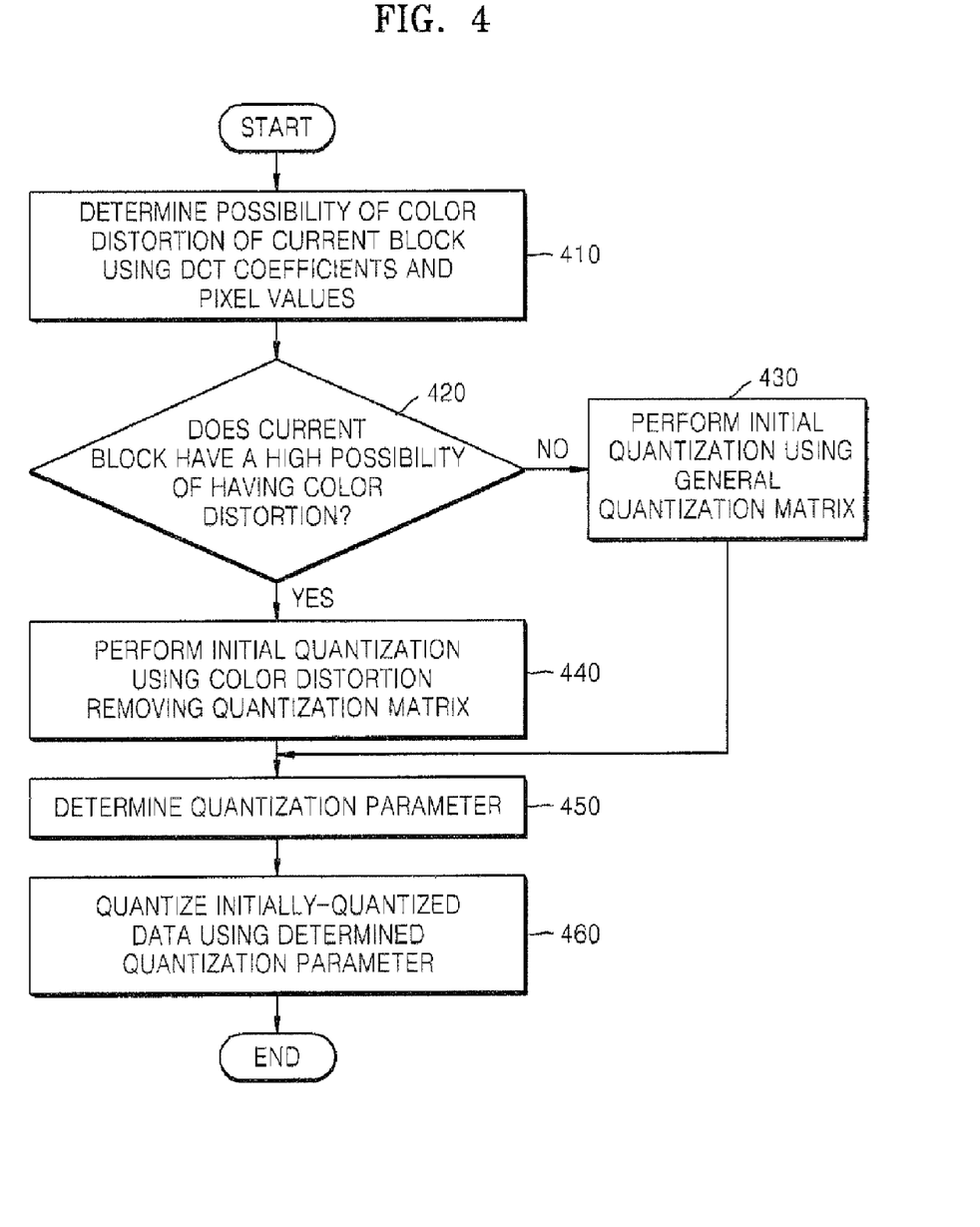
FIG. 4 is a flowchart illustrating an image quantizing method according to an exemplary embodiment of the present invention.

FIG. 3 is a detailed block diagram of an image quantization apparatus 300 according to an exemplary embodiment of the present invention and FIG. 4 is a flowchart illustrating an image quantization method according to an exemplary embodiment of the present invention. Hereinafter, the operation of the image quantization apparatus 300 and the image quantization method according to an exemplary embodiment of the present invention will be described in detail with reference to FIGS. 3 and 4.

Referring to FIG. 3, the image quantization apparatus 300 includes a color distortion determination unit 310, a selective quantization matrix application unit 320, a quantization parameter (QP) determination unit 330, and a quantization parameter application unit 340.

In operation 410, the color distortion determination unit 310 determines a possibility of color distortion using DCT coefficients and pixel values of an input current block. In particular, the color distortion determination unit 310 determines a possibility of color distortion for a chrominance block.

As mentioned above, color distortion occurs when there is a large difference between pixel values of fields of a chrominance block presented in an interlaced format, i.e., between pixel values of pixels in even-numbered rows and odd-numbered rows of the chrominance block. Thus, the color distortion determination unit 310 determines a possibility of color distortion using the distribution characteristic of DCT coefficients of an input current block and a difference between pixel values of pixels forming fields of the current block.

Figure 5:
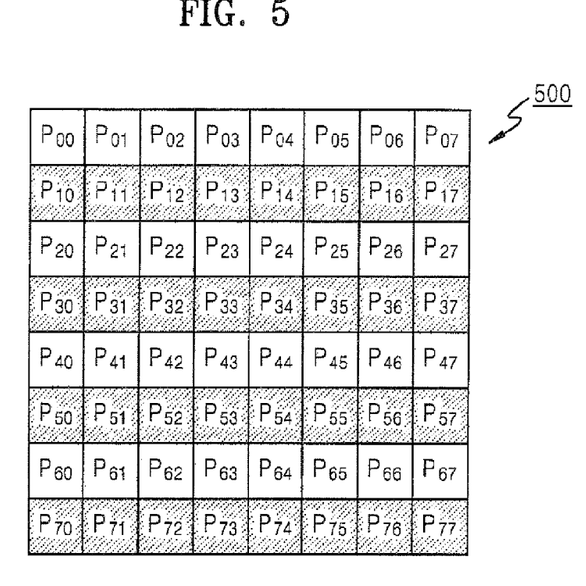
FIG. 5 illustrates an 8×8 block that is input to a color distortion determination unit 310 illustrated in FIG. 3.
Figure 6:
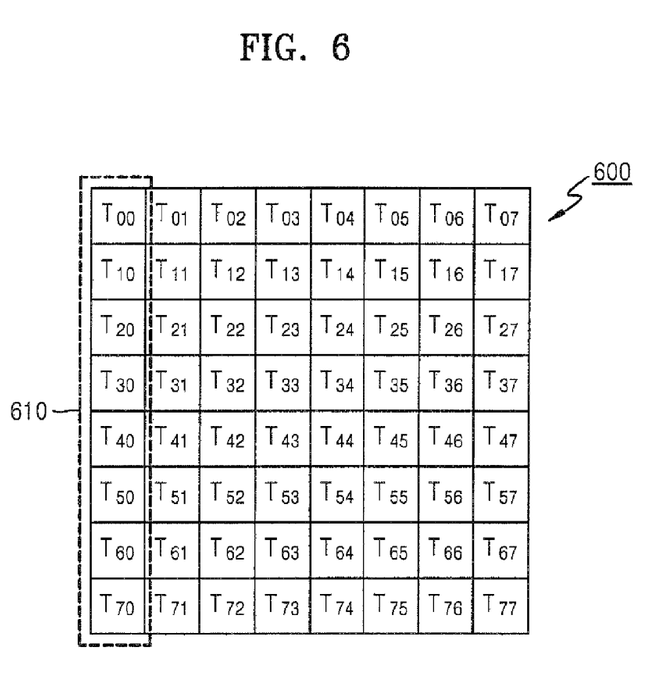
FIG. 6 illustrates a DCT transformed block of the 8×8 block illustrated in FIG. 5.

FIG. 5 illustrates an 8×8 block 500 input to the color distortion determination unit 310 illustrated in FIG. 3, and FIG. 6 illustrates a DCT-transformed block 600 of the 8×8 block 500 illustrated in FIG. 5. $P_{xy}$ indicates a pixel value of a pixel in an $x^{th}$ row and an $y^{th}$ column in FIG. 5, and $T_{xy}$ in FIG. 6 indicates a DCT coefficient corresponding to $P_{xy}$ in FIG. 5.

Referring to FIG. 5, the color distortion determination unit 310 determines that the input 8×8 block 500 has a high possibility of having color distortion if a difference between the average of pixel values P00, ..., P07, P20, ..., P27, P40, ..., P47, P60, ..., P67 of pixels in odd-numbered rows and the average of pixel values P10, ..., P17, P30, ..., P37, P50, ..., P57, P70, ..., P77 of pixels in even-numbered rows is greater than a predetermined threshold.

The color distortion determination unit 310 may determine a possibility of color distortion for the current block using the distribution characteristics of input DCT coefficients.

Figure 7:
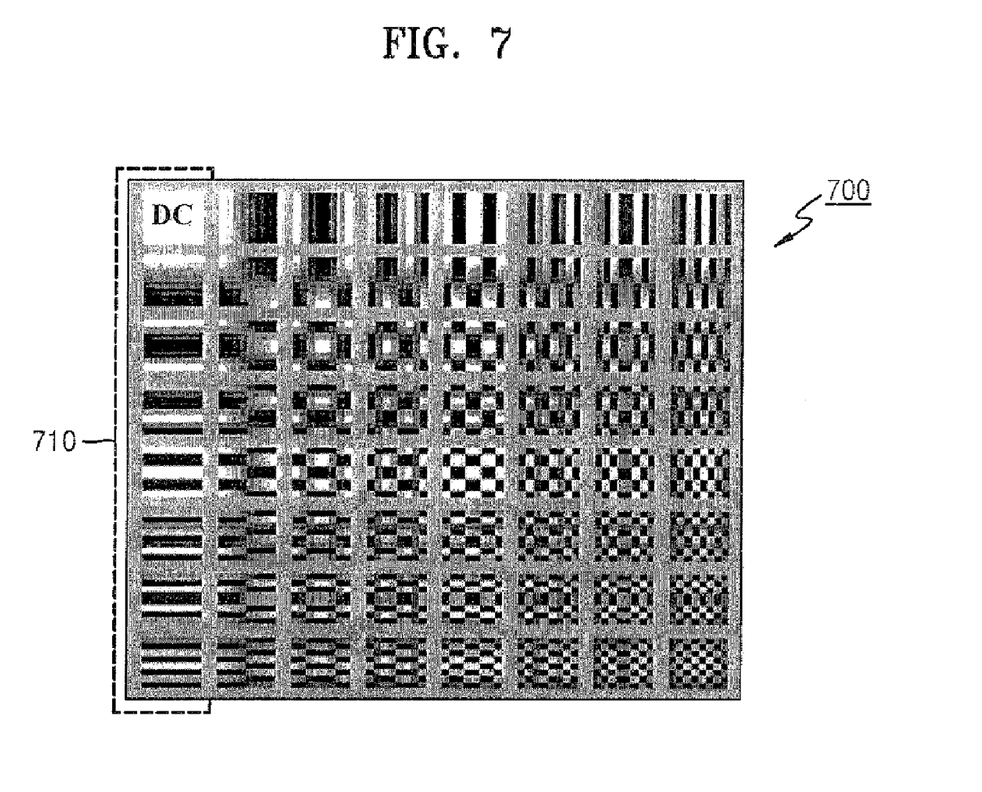
FIG. 7 illustrates a standard basic pattern for 8×8 DCT.

FIG. 7 illustrates standard basic patterns 700 for an 8×8 DCT. DCT coefficients are weights of a group of the standard basic patterns 700. An image block may be reconstructed by multiplying each of the standard basic patterns 700 by an appropriate weight, i.e., a DCT coefficient, and then combining the weighted standard basic patterns 700. Referring to FIG. 7, it can be seen that patterns 710 in the first column among the standard basic patterns 700 indicate the horizontal directivity of an input image. If DCT coefficients in the first column among DCT coefficients of an input block are greater than those in any other columns, it may be determined that the input block has high horizontal directivity. Further, a block with a high possibility of color distortion due to a large difference between pixel values of fields has high horizontal directivity.

Thus, the color distortion determination unit 310 may determine that the current block has a high possibility of color distortion if DCT coefficients $T_{00}, T_{10}, ..., T_{60}, T_{70}$ in the first column 610, of the block 600 transformed using DCT, indicating horizontal directivity are greater than those in any other columns of the block 600. For example, the color distortion determination unit 310 may determine that the input block has a high possibility of color distortion if the average of DCT coefficients in the first column of the DCT-transformed block 600 is greater than the average of DCT coefficients in any other columns of the DCT-transformed block 600. Preferably, the color distortion determination unit 310 may check a difference between pixel values of fields, compare DCT coefficients in the first column with DCT coefficients in the other columns, and then determine that the input block has a high possibility of color distortion if the difference is large and the DCT coefficients in the first column are greater than those in any other columns.

Referring back to FIGS. 3 and 4, the selective quantization matrix application unit 320 includes a quantization matrix application unit 321 and a color distortion removing quantization matrix application unit 322.

In operation 420, the selective quantization matrix application unit 320 determines whether the current chrominance block has a high possibility of color distortion. If the current chrominance block does not have a high possibility of color distortion, i.e., in operation 430, the quantization matrix application unit 321 performs initial quantization on the current chrominance block using a general quantization matrix according to the related art. The selective quantization matrix application unit 320 also performs initial quantization on a luminance block using a general quantization matrix according to the related art instead of a color distortion removing quantization matrix to be described later.

In operation 440, the color distortion removing quantization matrix application unit 322 performs initial quantization on a chrominance block with a high possibility of having color distortion using a color distortion removing quantization matrix.

Figure 8:
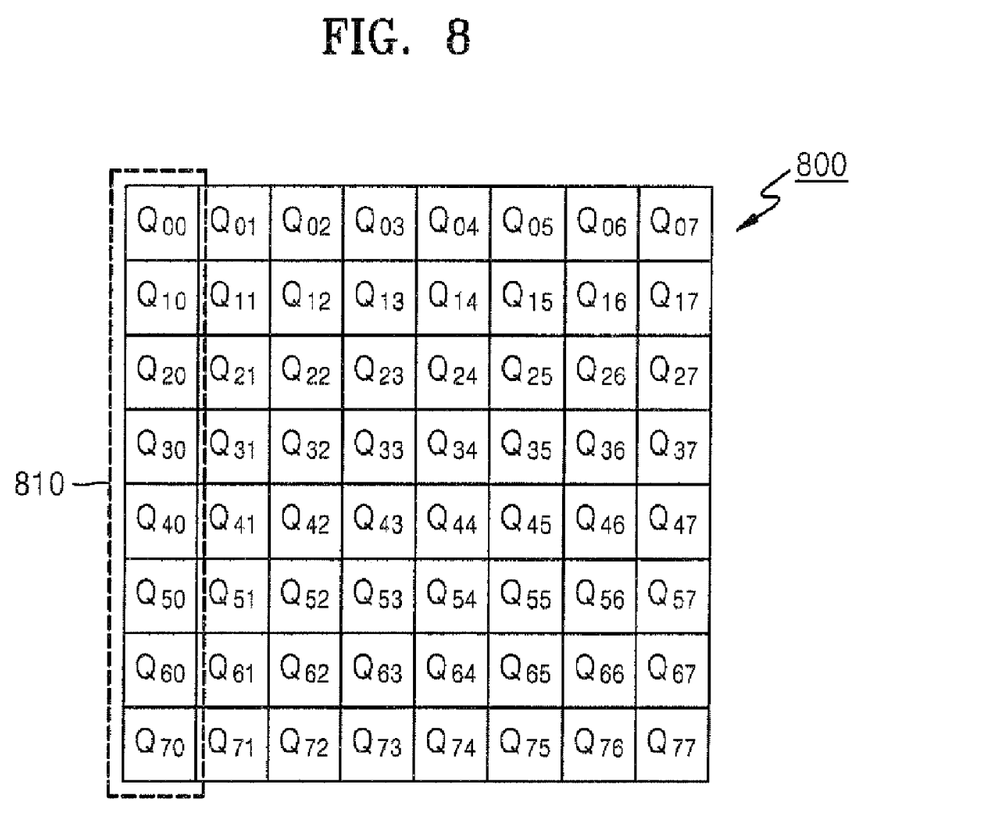
FIG. 8 illustrates a color distortion removing quantization matrix according to an exemplary embodiment of the present invention.

FIG. 8 illustrates a color distortion removing quantization matrix 800 for initial quantization of the DCT-transformed block 600 illustrated in FIG. 6. In FIG. 8, $Q_{xy}$ indicates components of the color distortion removing quantization matrix corresponding to $T_{xy}$ of FIG. 6.

In order to quantize DCT coefficients in the first column more elaborately than DCT coefficients in any other columns of a chrominance block with a high possibility of having color distortion, components 810 in the first column of the color distortion removing quantization matrix 800 have smaller values than those in the other columns. For example, a color distortion removing quantization matrix may be defined as follows:

$$\begin{bmatrix} 8 & 16 & 19 & 22 & 16 & 17 & 19 & 34 \\ 8 & 17 & 23 & 25 & 28 & 30 & 35 & 39 \\ 8 & 23 & 27 & 28 & 31 & 36 & 36 & 40 \\ 8 & 24 & 28 & 29 & 31 & 36 & 39 & 42 \\ 8 & 28 & 29 & 31 & 34 & 37 & 42 & 50 \\ 8 & 29 & 31 & 34 & 37 & 43 & 48 & 61 \\ 8 & 29 & 31 & 36 & 40 & 49 & 59 & 72 \\ 8 & 31 & 37 & 40 & 49 & 59 & 72 & 84 \end{bmatrix} \quad (6)$$

Referring to Equation 6, since components in the first column of the color distortion removing quantization matrix have smaller values than those in the other columns, DCT coefficients in the first column may be more elaborately quantized than those in the other columns by using the color distortion removing quantization matrix such as the one shown in Equation 6.

In operation 450, the QP determination unit 330 determines a QP to be applied to the chrominance block with a high possibility of having color distortion using the DCT coefficients and pixel values of the chrominance block. In particular, the QP determination unit 330 performs quantization on the chrominance block with a high possibility of having color distortion using a smaller QP than a currently set QP, thereby assigning a large amount of bits to the chrominance block with a high possibility of having color distortion.

More specifically, the QP determination unit 330 calculates a predetermined distortion weight indicating the degree of possible color distortion in the current block using the DCT coefficients and pixel values of the chrominance block of the current block and then determines a QP that is in inverse proportion to the calculated distortion weight, thereby allowing a chrominance block having a higher possibility of color distortion to be more elaborately quantized.

For example, when a sum of absolute values of DCT coefficients in the first column of a chrominance block is $E_1$, a sum of absolute values of the entire DCT coefficients of the chrominance block is $E_{all}$, the average of differences between pixel values of pixels in even-numbered rows of the chrominance block and pixel values of pixels in odd-numbered rows of the chrominance block is $P_{diff}$, and one pixel of the chrominance block is composed of n bits, the QP determination unit 330 can calculate a distortion weight $\alpha$ as follows:

$$\alpha = 1 + 0.5\left(\frac{E_1}{E_{all}} + \frac{P_{diff}}{2^n - 1}\right) \quad (7)$$

The QP determination unit 330 may also determine a QP using a video codec such as Test Model Near-Term Version 8 (TMN8) which is a well-known video codec test model of International Telecommunications Union—Telecommunication Standardization Sector (ITU-T), as follows:

$$QP_i = \sqrt{\frac{AK}{(B - ANC)} \frac{\sigma_i}{\alpha_i} \sum_{k=1}^{N} \alpha_k \sigma_k} \quad (i = 1, \ldots, N), \quad (8)$$

where $\alpha_i$ indicates a distortion weight of an $i^{th}$ macroblock, $\sigma_i$ indicates a standard deviation of the $i^{th}$ macroblock, A indicates the number of pixels in the current macroblock, K indicates a predetermined constant value (K is e/ln 2 if DCT coefficients show Laplacian distribution and independent distribution), C indicates an overhead rate (bits/pixel) required for encoding header information, B indicates the number of prediction bits required for encoding of a macroblock in a frame, and N indicates the number of macroblocks in a frame.

However, determination of a QP like Equation 8 is only an example and the QP determination unit 330 may determine a QP that is in inverse proportion to the distortion weight $\alpha$ calculated using Equation 7. In other words, the QP determination unit 330 sets a smaller QP for a chrominance block having a higher possibility of color distortion and sets a larger QP for a chrominance block having a lower possibility of color distortion.

In operation 460, the QP application unit 340 performs quantization on the initially-quantized DCT coefficients using the QP determined in operation 450 by the QP determination unit 330.

According to an exemplary embodiment of the present invention, initial quantization is performed on a chrominance block with a high possibility of having color distortion, a QP is determined to be in inverse proportion to the degree of the possibility of color distortion, and the amount of assigned bits is increased for the chrominance block with a high possibility of having color distortion, thereby reducing color distortion.

Figure 9A:
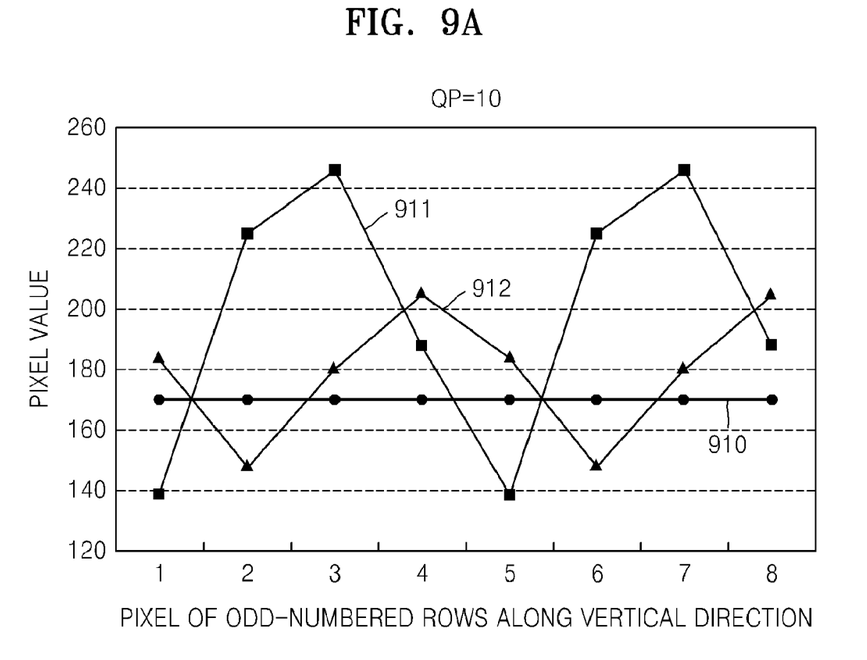
FIGS. 9A and 9B are graphs for comparing pixel values of a macroblock that is reconstructed after being quantized by an image quantization method according to an exemplary embodiment of the present invention with pixel values of a macroblock that is reconstructed after being quantized by an image quantization method according to the related art.
Figure 9B:
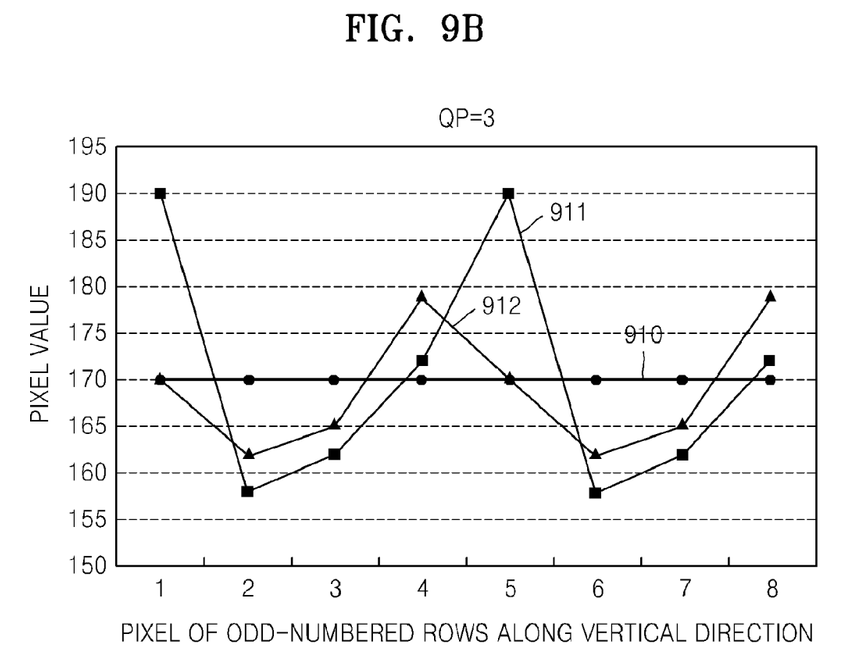

FIGS. 9A and 9B are graphs for comparing pixel values of a macroblock that is reconstructed after being quantized by an image quantization method according to the present invention with pixel values of odd-numbered rows of a macroblock that is reconstructed after being quantized by an image quantization method according to the prior art. In FIGS. 9A and 9B, an x axis indicates pixels of odd-numbered rows along the vertical direction of the reconstructed macroblock, i.e., pixels along the vertical direction that are sampled with respect to a column of the reconstructed macroblock. In the input macroblock, pixels in odd-numbered rows have pixel values of 170 and pixels in even-numbered rows have pixel values of 30 like in Equation 4.

Referring to FIGS. 9A and 9B, pixel values 910 represent the original pixel values of odd-numbered rows of an input macroblock. Pixel values 912 represent values of odd-numbered rows of a reconstructed macroblock after being quantized according to an exemplary embodiment of the present invention, and pixel values 911 represent values of odd-numbered rows of a reconstructed macroblock after being quantized according to an exemplary embodiment of the related art. As illustrated in FIGS. 9A and 9B, the pixel values 911 have large vertical changes from the original pixel values, but the pixel values 912 have smaller vertical changes and more closely approximate the original pixel values 910 than the pixel values 911, thereby reducing color distortion.

The present invention can also be embodied as computer-readable code on a computer-readable recording medium. The computer-readable recording medium is any data storage device that can store data which can be thereafter read by a computer system. Examples of a computer-readable recording medium include read-only memory (ROM), random-access memory (RAM), CD-ROMs, magnetic tapes, floppy disks, and optical data storage devices.

According to the exemplary embodiments of the present invention, it is possible to reduce color distortion which causes a large difference between pixel values of fields of a chrominance block which can be avoided in block-based encoding and improve compression efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image quantization method comprising:
   determining a possibility of color distortion using discrete cosine transform (DCT) coefficients and pixel values of a block of an image; and
   performing initial quantization on the block using a color distortion removing quantization matrix to remove color distortion if the block has a high possibility of color distortion,
   wherein the determining the possibility of color distortion comprises determining that the block has the high possibility of color distortion if an average of differences between the pixel values of pixels in even-numbered rows of the block and the pixel values of pixels in odd-numbered rows of the block is greater than a threshold.

2. The image quantization method of claim 1, wherein the determining the possibility of color distortion comprises determining that the block has the high possibility of color distortion if the DCT coefficients having horizontal directivity in a first column of a DCT block corresponding to the block of the image are greater than the DCT coefficients in any other columns of the DCT block.

3. The image quantization method of claim 1, wherein the determining the possibility of color distortion comprises determining that the block has the high possibility of color distortion if an average of the DCT coefficients in a first column of the block is greater than an average of the DCT coefficients in any other columns of the block.

4. The image quantization method of claim 1, wherein components in a first column of the color distortion removing quantization matrix have smaller values than those in any other columns of the color distortion removing quantization matrix in order to more elaborately quantize the DCT coefficients in a first column of a DCT block, corresponding to the block, than the DCT coefficients in any other columns of the DCT block, wherein the block has a high possibility of having color distortion.

5. The image quantization method of claim 4, wherein a size of the block is 8×8 and the color distortion removing quantization matrix is as follows:

$$\begin{bmatrix} 8 & 16 & 19 & 22 & 16 & 17 & 19 & 34 \\ 8 & 17 & 23 & 25 & 28 & 30 & 35 & 39 \\ 8 & 23 & 27 & 28 & 31 & 36 & 36 & 40 \\ 8 & 24 & 28 & 29 & 31 & 36 & 39 & 42 \\ 8 & 28 & 29 & 31 & 34 & 37 & 42 & 50 \\ 8 & 29 & 31 & 34 & 37 & 43 & 48 & 61 \\ 8 & 29 & 31 & 36 & 40 & 49 & 59 & 72 \\ 8 & 31 & 37 & 40 & 49 & 59 & 72 & 84 \end{bmatrix}.$$

6. The image quantization method of claim 1, further comprising:
   determining a quantization parameter (QP) to be applied to the block using the DCT coefficients and the pixel values of the block; and
   quantizing the initially-quantized data using the determined QP and providing compressed data.

7. The image quantization method of claim 6, wherein if the block has a high possibility of having color distortion, the determining the QP further comprises determining the QP to be applied to the block to be smaller than a currently set QP.

8. The image quantization method of claim 6, wherein if the block has a high possibility of having color distortion, the determining the QP further comprises:
   calculating a distortion weight a that is proportional to the possibility of color distortion of the block using a sum of absolute values of the DCT coefficients in a first column of the block, a sum of absolute values of the entire DCT coefficients of the block, and an average of differences between the pixel values of pixels in even-numbered rows of the block and the pixel values of pixels in odd-numbered rows of the block; and
   determining the QP to be in inverse proportion to the calculated distortion weight α.

9. The image quantization method of claim 8, wherein the distortion weight α is calculated using $$\alpha = 1 + 0.5\left(\frac{E_1}{E_{all}} + \frac{P_{diff}}{2^n - 1}\right),$$

where the sum of absolute values of the DCT coefficients in the first column of the block is $E_1$, the sum of absolute values of the entire DCT coefficients of the block is $E_{all}$, the average of the differences between the pixel values of pixels in even-numbered rows of the block and the pixel values of pixels in odd-numbered rows of the block is $P_{diff}$, and each pixel of the block is composed of n bits.

10. The image quantization method of claim 8, wherein a $QP_i$ of an $i^{th}$ macroblock is calculated using $$QP_i = \sqrt{\frac{AK}{(B - ANC)} \frac{\sigma_i}{\alpha_i} \sum_{k=1}^{N} \alpha_k \sigma_k} \ (i = 1, \ldots, N),$$

where $\alpha_i$ indicates a distortion weight of an $i^{th}$ macroblock, $\sigma_i$ indicates a standard deviation of the $i^{th}$ macroblock, A indicates a number of pixels in a current macroblock, K indicates a predetermined constant value (K is e/ln(2) if the DCT coefficients show a Laplacian distribution and an independent distribution), C indicates an overhead rate (bits/pixel) required to encode header information, B indicates a number of prediction bits required to encode a macroblock in a frame, and N indicates a number of macroblocks in the frame.

11. The image quantization method of claim 1, wherein the image is presented in an interlaced format and the block is a chrominance block sampled at a ratio of 4:2:0.

12. An image quantization apparatus comprising:
a processor programmed to control:
a color distortion determination unit which determines a possibility of color distortion using discrete cosine transform (DCT) coefficients and pixel values of a block of an image; and
a color distortion removing unit which performs initial quantization on the block using a color distortion removing quantization matrix to remove color distortion if the block has a high possibility of color distortion,
wherein the color distortion determination unit determines that the block has the high possibility of color distortion if an average of differences between the pixel values of pixels in even-numbered rows of the block and the pixel values of pixels in odd-numbered rows of the block is greater than a threshold.

13. The image quantization apparatus of claim 12, wherein the color distortion determination unit determines that the block has the high possibility of color distortion if the DCT coefficients having horizontal directivity in a first column of a DCT block corresponding to the block of the image horizontal directivity are greater than the DCT coefficients in any other columns of the DCT block.

14. The image quantization apparatus of claim 12, wherein the color distortion determination unit determines that the block has the high possibility of color distortion if an average of the DCT coefficients in a first column of the block is greater than an average of the DCT coefficients in any other columns of the block.

15. The image quantization apparatus of claim 12, wherein components in a first column of the color distortion removing quantization matrix have smaller values than those in any other columns of the color distortion removing quantization matrix in order to more elaborately quantize the DCT coefficients in a first column of a DCT block, corresponding to the block, than the DCT coefficients in any other columns of the DCT block, wherein the block has the high possibility of having color distortion.

16. The image quantization apparatus of claim 15, wherein a size of the block is 8×8 and the color distortion removing quantization matrix is as follows:

$$\begin{bmatrix} 8 & 16 & 19 & 22 & 16 & 17 & 19 & 34 \\ 8 & 17 & 23 & 25 & 28 & 30 & 35 & 39 \\ 8 & 23 & 27 & 28 & 31 & 36 & 36 & 40 \\ 8 & 24 & 28 & 29 & 31 & 36 & 39 & 42 \\ 8 & 28 & 29 & 31 & 34 & 37 & 42 & 50 \\ 8 & 29 & 31 & 34 & 37 & 43 & 48 & 61 \\ 8 & 29 & 31 & 36 & 40 & 49 & 59 & 72 \\ 8 & 31 & 37 & 40 & 49 & 59 & 72 & 84 \end{bmatrix}.$$

17. The image quantization apparatus of claim 12, further comprising:
a quantization parameter (QP) determination unit which determines a quantization QP to be applied to the block using the DCT coefficients and the pixel values of the block; and
a QP application unit quantizing the initially-quantized data using the determined QP and providing compressed data.

18. The image quantization apparatus of claim 17, wherein if the block has the high possibility of having color distortion, the QP determination unit determines the QP to be applied to the block to be smaller than a currently set QP.

19. The image quantization apparatus of claim 17, wherein if the block has the high possibility of having color distortion, the QP determination unit calculates a distortion weight a that is proportional to the possibility of color distortion of the block using a sum of absolute values of the DCT coefficients in a first column of the block, a sum of absolute values of the entire DCT coefficients of the block, and an average of differences between the pixel values of pixels in even-numbered rows of the block and the pixel values of pixels in odd-numbered rows of the block and determines the QP to be in inverse proportion to the calculated distortion weight α.

20. The image quantization apparatus of claim 19, wherein the distortion weight α is calculated using $$\alpha = 1 + 0.5\left(\frac{E_1}{E_{all}} + \frac{P_{diff}}{2^n - 1}\right),$$

where the sum of absolute values of the DCT coefficients in the first column of the block is $E_1$, the sum of absolute values of the entire DCT coefficients of the block is $E_{all}$, the average of the differences between the pixel values of pixels in even-numbered rows of the block and the pixel values of pixels in odd-numbered rows of the block is $P_{diff}$, and each pixel of the block is composed of n bits.

21. The image quantization apparatus of claim 19, wherein a $QP_i$ of an $i^{th}$ macroblock is calculated using $$QP_i = \sqrt{\frac{AK}{(B - ANC)} \frac{\sigma_i}{\alpha_i} \sum_{k=1}^{N} \alpha_k \sigma_k} \ (i = 1, \ldots, N),$$

where $\alpha_i$ indicates a distortion weight of the $i^{th}$ macroblock, $\sigma_i$ indicates a standard deviation of the $i^{th}$ macroblock, A indicates a number of pixels in a current macroblock, K indicates a predetermined constant value (K is e/ln(2) if the DCT coefficients show a Laplacian distribution and an independent distribution), C indicates an overhead rate (bits/pixel) required to encode header information, B indicates a number of prediction bits required to encode a macroblock in a frame, and N indicates a number of macroblocks in the frame.

22. The image quantization apparatus of claim 12, wherein the image is presented in an interlaced format and the block is a chrominance block sampled at a ratio of 4:2:0.

\* \* \* \* \*